United States Patent [19]
Kanaya

[11] Patent Number: 5,985,015
[45] Date of Patent: Nov. 16, 1999

[54] INK COMPOSITION FOR INK JET RECORDING AND INK SET

[75] Inventor: Miharu Kanaya, Suwa, Japan

[73] Assignee: Seiko Epson Corporation, Tokyo-To, Japan

[21] Appl. No.: 08/957,127

[22] Filed: Oct. 24, 1997

[30] Foreign Application Priority Data

Oct. 24, 1996 [JP] Japan .................................. 8-282733

[51] Int. Cl.$^6$ .................................................. C09D 11/02
[52] U.S. Cl. .................. 106/31.6; 106/31.75; 106/31.86
[58] Field of Search ................ 106/31.75, 31.6, 106/31.9, 31.28, 31.58, 31.86

[56] References Cited

U.S. PATENT DOCUMENTS

| | | | |
|---|---|---|---|
| 5,344,487 | 9/1994 | Whalen-Shaw | 106/31.9 |
| 5,571,311 | 11/1996 | Belmont et al. | 106/31.75 |
| 5,630,868 | 5/1997 | Belmont et al. | 106/31.75 |
| 5,672,198 | 9/1997 | Belmont | 106/31.75 |
| 5,698,016 | 12/1997 | Adms et al. | 106/31.6 |
| 5,707,432 | 1/1998 | Adams et al. | 106/31.75 |
| 5,713,988 | 2/1998 | Belmont et al. | 106/31.75 |
| 5,749,950 | 5/1998 | Mahmud et al. | 106/31.9 |

FOREIGN PATENT DOCUMENTS

| | | |
|---|---|---|
| 0098338 | 1/1984 | European Pat. Off. . |
| 588316 | 3/1994 | European Pat. Off. . |
| 0802247 | 10/1997 | European Pat. Off. . |
| 9618688 | 6/1996 | WIPO . |
| 9618689 | 6/1996 | WIPO . |
| 9618696 | 6/1996 | WIPO . |

*Primary Examiner*—Helene Klemanski
*Attorney, Agent, or Firm*—Ladas & Parry

[57] ABSTRACT

An ink composition for ink jet recording is provided which can realize a good image even on plain paper, specifically an image having high print density and no significant feather or bleeding. A carbon black having on its surface a cationic group is utilized as a colorant. Further, use of this colorant in combination with a color ink containing an anionic material, for example, an anionic dye can realize a good color image free from color-to-color bleeding.

22 Claims, No Drawings

INK COMPOSITION FOR INK JET RECORDING AND INK SET

BACKGROUND OF THE INVENTION

1. Field of the Invention

The present invention relates to an ink for ink jet recording and an ink set comprising the same.

2. Background Art

An ink jet recording system is a method wherein an ink is ejected as droplets through fine nozzles and deposited on a recording medium to record thereon letters, figures, and images.

Examples of the ink jet recording system include methods, which have been put to practical use, such as a method wherein an ink is ejected utilizing vibration of a piezoelectric element and a method wherein an ink is ejected utilizing foaming created by rapidly applying heat to the ink. In recent years, the ink jet recording method has rapidly spread because use of a thermal transfer, sublimation, or laser method has offered advantages including easy formation of color images, low cost, and low running cost.

Inks used in such ink jet recording are required to have the following various properties according to the nature of the recording methods.

(1) High-quality images should be yielded on specialty paper (coated paper, gloss paper, films, and clothes treated for use in ink jet recording), as well as on plain paper (paper not subjected to any special surface treatment and including copying paper, reporting paper, bond paper, and letter paper, generally used in offices, schools, households and the like).

(2) The ink should be rapidly fixed, making it possible to realize high-speed printing.

(3) The ink should be less likely to clog nozzles and hence should be stably ejected without droplet trajectory directionality and dropout problems.

(4) The ink should realize images possessing excellent lightfastness and waterproofness.

(5) The ink should have good long-term storage stability.

In particular, for the requirement (1), an ink composition is demanded which can realize an image having no significant feather or bleeding on plain paper. There are various types of plain paper which are different from one another in surface state (density, length, penetration and the like of paper fibers). Therefore, feathering or bleeding is created in paper having good ink penetration. On the other hand, in paper having poor ink penetration, the drying of the printed image is so slow that, at the time of color printing, inks create color to color bleeding at boundaries therebetween, resulting in deteriorated print quality.

For the requirement (4), utilization of a pigment, such as carbon black, has been attempted from the viewpoint of waterproofness and lightfastness of printed images. For ink compositions for ink jet recording, water is used as a main solvent from the viewpoint of safety. Therefore, in order to provide a good ink composition for ink jet recording, a pigment, which is essentially insoluble in water, should be stably dispersed in water.

On the other hand, International Patent Publications WO 96/18688, WO 96/18689 and WO 96/18696 disclose a modified carbon black which has been rendered stable water-dispersion. In the present specification, the modified carbon black described in the above publications will be hereinafter referred to simply as "modified carbon black." These publications do not disclose any advantage associated with the use of the modified carbon black as a colorant for an ink composition for ink jet recording.

SUMMARY OF THE INVENTION

The present inventors have now found that use of a certain "modified carbon black" as a colorant of an ink composition for ink jet recording can realize an image having high print density and, in addition, no significant feathering or bleeding. Further, they have found that use of a black ink, containing this certain "modified carbon black" as a colorant, in combination with a color ink containing a specific anionic material to form an image can effectively prevent color-to-color intermixing, that is, bleeding. The present invention has been made based on these finding.

Accordingly, an object of the present invention is to provide an ink composition for ink jet recording which has good blackness and in addition can realize an image having no significant feathering.

Another object of the present invention is to provide an ink set for ink jet recording which can realize an image having no significant color-to-color intermixing, that is, no significant bleeding.

According to one aspect of the present invention, there is provided an ink composition for ink jet recording, comprising at least a carbon black having on its surface a cationic group.

According to another aspect of the present invention, there is provided an ink set for ink jet recording, comprising a plurality of ink compositions including the above ink composition according to the present invention.

DETAILED DESCRIPTION OF THE INVENTION

Ink jet recording method

The ink composition according to the present invention is suitable for use in ink jet recording. The ink jet recording or ink jet recording method herein refers to a method wherein an ink is ejected as droplets through fine nozzles to perform recording. Examples of the ink jet recording include a method wherein an ink is ejected utilizing vibration of a piezoelectric element and a method wherein an ink is ejected utilizing foaming created by rapidly applying heat to the ink. In particular, the method utilizing the ejection of an ink by vibration of a piezoelectric element can be preferably applied.

Modified carbon black

The modified carbon black utilized in the present invention is a carbon black having on its surface a cationic group. More specifically, such modified carbon blacks are disclosed in International Patent Publications WO 96/18689 and WO 96/18696 noted above.

Combination of an ink composition, containing a carbon black having on its surface a cationic group as a colorant, with ink jet recording can offer unexpected high print density and, in addition, realize an image having no significant feathering or bleeding.

Cationic groups usable herein include organic groups containing quaternary ammonium groups ($-NR_3^+$) or quaternary phosphonium groups ($-PR_3^+$), wherein R represents hydrogen or an alkyl, alkoxy, phenyl, or naphthyl group. Further, the cationic group may be such that two Rs combine with each other to form a cyclic quaternary amine, a quaternary aromatic amine, or a quaternary phosphonium, for example, a pyridine ring or a morpholine ring. According to a preferred embodiment of the present invention, this cationic group is attached to an aromatic group (for example, phenyl or naphthyl) and then attached to the surface of the carbon black through the aromatic group.

According to a preferred embodiment of the present invention, the organic group containing the cationic group has a cyclic structure. The cationic group may have a cyclic structure, or alternatively, a portion other than the cationic group (for example, a portion, such as the above aromatic group, serving to attach the cationic group to the surface of the carbon black) may have a cyclic structure. Examples of organic groups having a cationic group preferred in the present invention include, $-(C_5H_4N^+)^C{}_2H_5$, $-C_6H_4(N^+C_5H_5)$, $-C_6H_4COCH_2N^+(CH_3)_3$, $-C_6H_4COCH_2(N^+C_5H_5)$, $-(C_5H_4N^+)CH_3$, $-C_6H_4CH_2N^+(CH_3)_3$, $-(C_5H_4N^+)CHCOCH_3$, $-(C_5H_4N^+)CHCOC_6H_5$, and $-C_6H_4CH_2N^+(CH_3)_2H$.

In the black ink composition according to the present invention, the amount of the modified carbon black added may be suitably determined. However, it is preferably about 1 to 15% by weight, more preferably about 3 to 10% by weight, based on the ink composition.

Preferably, the black ink according to the present invention contains a polyhydric alcohol. This polyhydric alcohol functions to prevent clogging of nozzles in an ink jet recording head. Further, it functions to aid redispersion of the ink upon solidification in nozzles.

Preferred examples of polyhydric alcohols include ethylene glycol, diethylene glycol, triethylene glycol, polyethylene glycol, propylene glycol, 1,3-propanediol, 1,5-pentanediol, 1,2,6-hexanetriol, and glycerin. They may be used alone or in combination of two or more. The amount of the polyhydric alcohol added is preferably 3 to 30% by weight based on the ink composition. The polyhydric alcohol, when added in this amount range, can effectively prevent nozzle clogging and, in addition, can impart good drying properties to the ink composition.

When the carbon black having in its surface a cationic group utilized in the present invention is dispersed in water, the dispersion is likely to be acidic. The ink is preferably neutral or weakly alkaline with the pH being, for example, 7 to 10, from the viewpoints of deterioration of members constituting an ink jet printer by corrosion or the like and safe handling. Therefore, preferably, the black ink according to the present invention contains a pH adjustor. Preferred examples of pH adjustors include ammonia or tri (hydroxyalkyl)amines, such as triethanolamine. Inorganic salts, such as hydroxides of alkali metals, sometimes deteriorate the dispersion stability of the modified carbon black, and, in such cases, preferably, use of these inorganic salts is avoided.

Further, the black ink according to the present invention may, if necessary, contain a lower alcohol, such as methanol, ethanol, propanol, or isopropanol; an ether of a polyhydric alcohol, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monoethyl ether, triethylene glycol monobutyl ether, propylene glycol monobutyl ether, or dipropylene glycol monobutyl ether; a nitrogen-containing compound, such as 2-pyrrolidone, N-methyl-2-pyrrolidone, or 1,3-dimethyl-2-imidazolidinone; a sulfur-containing compound, such as thiodiglycol; a saccharide, such as glucose, mannose, fructose, galactose, maltose, or sucrose; a surfactant; an antimold; an antirust; and the like.

According to a preferred embodiment of the present invention, preferably, the black ink according to the present invention further comprises a cationic substance. As described below, use of the black ink according to the present invention in combination with a color ink comprising an anionic material can realize an image having no significant color-to-color bleeding. The colorant contained in the black ink according to the present invention is a carbon black having on its surface a cationic group. This cationic group is considered to react with the anionic material contained in the color ink to realize an image having no significant bleeding. Further addition of a cationic substance to the black ink is considered to accelerate the reaction, thereby more effectively inhibiting the bleeding. However, it should be noted that the above explanation is hypothetical and the present invention is not limited to such a mechanism. Preferred examples of cationic substances usable herein include compounds containing in their molecules primary, secondary, tertiary, and quaternary amines or ammonium, phosphorus, or phosphonium. More specific examples thereof include alkyltrimethylammonium chloride, dialkyldimethylammonium chloride, polyallylamine, polyethyleneimine, polyisocyanate, polydialkylallylammonium, polydimethyldiallylammonium chloride, cationized polyvinylpyrrolidone, cationized polyvinyl alcohol, Arquad (a product of Lion-Akzo Co., Ltd.), Gohsefimer (a product of Nippon Synthetic Chemical Industry Co., Ltd.), Adeka Catioace (a product of Asahi Denka Kogyo Ltd.), and Elastron (a product of Dai-Ichi Kogyo Seiyaku Co., Ltd.).

The amount of the cationic substance added may be suitably determined. It, however, is preferably about 0.5 to 10% by weight, more preferably about 1 to 5% by weight, based on the ink composition.

Preferably, the properties of the black ink according to the present invention are those suitable for ink jet recording.

Ink set

As described above, the black ink according to the present invention can offer high print density and in addition can realize an image having no significant feathering or bleeding. Use of the black ink according to the present invention in combination with other color inks can realize a good color image. According to the present invention, there is provided an ink set for ink jet recording, comprising a plurality of ink compositions including the black ink according to the present invention. The color ink is generally at least one color ink selected from a yellow ink, a magenta ink, and a cyan ink.

According to a preferred embodiment of the present invention, preferably, the color ink contained in the ink set according to the present invention comprises an anionic material. Such an ink set can realize an image having no significant color-to-color bleeding. As described above, the colorant contained in the black ink according to the present invention is a carbon black having on its surface a cationic group. This cationic group is considered to react with the anionic material contained in the color ink to realize an image having no significant bleeding.

According to a preferred embodiment of the present invention, the anionic material may be an anionic dye. Anionic dyes usable herein include, for example, dyes containing at least a sulfonic acid group or a carboxylic acid group. More specific examples thereof include C.I. Direct Yellow 55, 86, 132, 142, and 144, C.I. Acid Yellow 23, C.I. Direct Red 9 and 227, C.I. Acid Red 52, 249, 254, and 289, C.I. Reactive Red 17 and 180, C.I. Direct Blue 85, 86, 87, 199, and 226, and C.I. Acid Blue 9 and 23. Preferred examples thereof include dyes 1, 2, and 3 respectively having the following structures.

Dye 1:

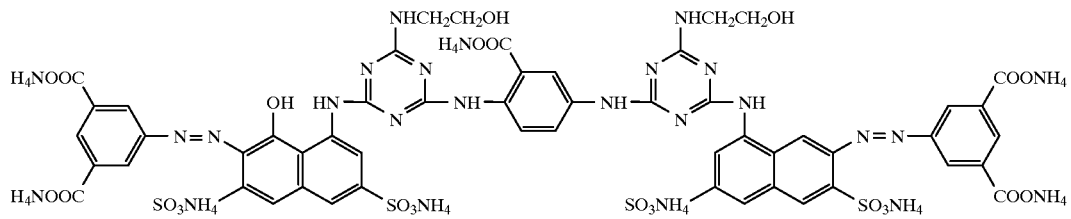

Dye 2:

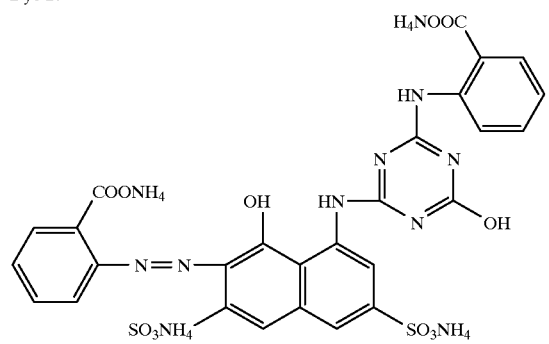

Dye 3:

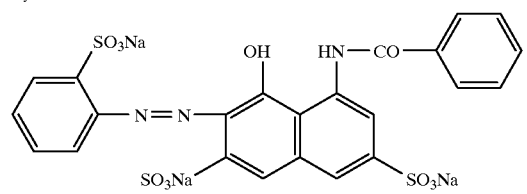

The amount of the dye added may be suitably determined. For example, it is preferably about 0.5 to 10% by weight, more preferably 1 to 5% by weight, based on the color ink.

According to a preferred embodiment of the present invention, the color ink comprises a nonionic acetylene glycol surfactant. Addition of the nonionic acetylene glycol surfactant can further inhibit the color-to-color bleeding. Examples of nonionic acetylene glycol surfactants usable herein include 2,4,7,9-tetramethyl-5-decyne-4,7-diol, 3,6-dimethyl-4-octyne-3,6-diol, and 3,5-dimethyl-1-hexyne-3-ol. Commercially available acetylene glycol surfactants may also be utilized. Specific examples thereof include Surfynol 104, 82, 465, 485, and TG (products of Air Products, USA), and Olfine E1010, E104, and STG (products of Nissin Chemical Industry Co., Ltd.).

The amount of the nonionic acetylene glycol surfactant added may be suitably determined. For example, it is preferably about 0.1 to 3.0% by weight based on the color ink.

According to a preferred embodiment of the present invention, the color ink of the ink set according to the present invention comprises a glycol ether. Addition of the glycol ether can further inhibit the color-to-color bleeding. Preferred examples of glycol ethers usable herein include ethylene glycol monobutyl ether, diethylene glycol monobutyl ether, triethylene glycol monoethyl ether, propylene glycol monoethyl ether, propylene glycol monomethyl ether, dipropylene glycol monoethyl ether, propylene glycol monobutyl ether, dipropylene glycol monobutyl ether, and triethylene glycol monobutyl ether. Particularly preferred are diethylene glycol monobutyl ether, triethylene glycol monobutyl ether, propylene glycol monobutyl ether, and dipropylene glycol monobutyl ether. They may be use alone or as a mixture of two or more. The amount of the glycol ether added may be suitably determined. However, it is preferably about 3 to 30% by weight based on the color ink.

According to a preferred embodiment of the present invention, the color ink in the ink set according to the present invention is used in combination with a nonionic acetylene glycol surfactant and a glycol ether. Presence of both the materials in the color ink can further inhibit color-to-color bleeding between the black ink and the color ink and also effective in inhibiting color-to-color bleeding between color inks.

The color ink in the ink set according to the present invention may, if necessary, contain other components. Examples of such components include polyhydric alcohols, such as ethylene glycol, diethylene glycol, triethylene glycol, polyethylene glycol, propylene glycol, 1,3-propanediol, 1,5-pentanediol, 1,2,6-hexanetriol, and glycerin; lower alcohols, such as methanol, ethanol, propanol, and isopropanol; nitrogen-containing compounds, such as urea, diethanolamine, triethanolamine, 2-pyrrolidone, N-methyl-2-pyrrolidone, and 1,3-dimethyl-2-imidazolidinone; sulfur-containing compounds, such as thiodiglycol; saccharides, such as glucose, mannose, fructose, galactose, maltose, and sucrose; metal hydroxides, such as LiOH, NaOH, and KOH; water-soluble polymers sodium arginate; fluorosurfactants; antimolds; antirusts; and chelating agents.

Preferably, the properties of the color ink according to the present invention are those suitable for ink jet recording. For example, a surface tension of 20 to 35 mN/m is preferred from the viewpoint of stable ejection, suitable spreading of dots, and circularity of dots.

EXAMPLES

The present invention will be described in more detail with reference to the following examples, though it is not limited to these examples only.

Preparation of ink composition

Ink compositions, black inks B1 to B5, yellow inks Y1 and Y2, magenta inks M1 and M2, and cyan inks C1 and C2, and, black inks b6 and b7, yellow ink y3, magenta ink m3, and cyan ink c3, were prepared.

In the following examples, all "%" are by weight.

Further, in the following examples, dispersions (i) and (ii) are carbon black dispersions, prepared according to the description of WO 96/18696, respectively having —$C_5H_4N^+$—$C_2H_5$ and —$C_6H_4$—$N^+$—$(CH_3)_2H$ bonded to the surface of the carbon black.

Abbreviations used in the following examples are as follows.

TEGmBE: triethylene glycol monobutyl ether
DEGmBE: diethylene glycol monobutyl ether Black ink B1

| | |
|---|---|
| Dispersion (1) | 30% (pigment content 4.5%) |
| Glycerin | 15% |
| 5% aqueous ammonia solution | 5% |
| Ethanol | 4% |
| Ion exchanged water | Balance |

Black ink B2

| | |
|---|---|
| Dispersion (i) | 40% (pigment content 6%) |
| Glycerin | 10% |
| Diethylene glycol | 10% |
| Triethanolamine | 1% |
| Olfine E1010 | 1% |
| Ion exchanged water | Balance |

Black ink B3

| | |
|---|---|
| Dispersion (i) | 60% (pigment content 8%) |
| Glycerin | 15% |
| Triethanolamine | 1% |
| 30% aqueous polyethyleneimine solution | 3% |
| TEGmBE | 10% |
| Ion exchanged water | Balance |

Black ink B4

| | |
|---|---|
| Dispersion (ii) | 30% (pigment content 4.5%) |
| 1,2,6-Hexanetriol | 5% |
| Diethylene glycol | 10% |
| Triethanolamine | 1% |
| Adeka Catioace DM (quaternary ammonium salt type cationic polymer) | 1% |
| Olfine E1010 | 1% |
| Ion exchanged water | Balance |

Black ink B5

| | |
|---|---|
| Dispersion (ii) | 30% (pigment content 4.5%) |
| Glycerin | 10% |
| Maltose | 7% |
| Triethanolamine | 1% |
| Gohsefimer K (cationized polyvinyl pyrrolidone) | 3% |
| 2-Pyrrolidone | 10% |
| Ion exchanged water | Balance |

Black ink b6

| | |
|---|---|
| Pigment dispersion | 60% (pigment content 6%) |
| Glycerin | 10% |
| Diethylene glycol | 10% |
| Triethanolamine | 1% |
| Olfine E1010 | 1% |
| Ion exchanged water | Balance |

The pigment dispersion in the black ink b6 was prepared by mixing 10% of carbon black with 1.5% of a styrene/acrylic acid/ethyl acrylate copolymer, 82.5% of ion exchanged water, and 5% of ethylene glycol and performing dispersion by means of a sand mill.

Black ink b7

| | |
|---|---|
| C.I. Food Black | 2.6% |
| Glycerin | 10% |
| Diethylene glycol | 10% |
| Triethanolamine | 1% |
| Olfine E1010 | 1% |
| Ion exchanged water | Balance |

Yellow ink Y1

| | |
|---|---|
| C.I. Direct Yellow 86 | 2.5% |
| Diethylene glycol | 15% |
| DEGmBE | 10% |
| Olfine STG | 0.5% |
| Ion exchanged water | Balance |

Yellow ink Y2

| | |
|---|---|
| C.I. Direct Yellow 144 | 3% |
| Diethylene glycol | 15% |
| TEGmBE | 10% |
| Olfine E1010 | 1.5% |
| Triethanolamine | 0.5% |
| Ion exchanged water | Balance |

Yellow ink y3

| | |
|---|---|
| C.I. Direct Yellow 86 | 2.5% |
| Glycerin | 15% |
| Ethanol | 4% |
| Ion exchanged water | Balance |

Magenta ink M1

| | |
|---|---|
| C.I. Direct Red 227 | 2.5% |
| Diethylene glycol | 15% |
| DEGmBE | 10% |
| Olfine STG | 0.5% |
| Potassium hydroxide | 0.1% |
| Ion exchanged water | Balance |

Magenta ink M2

| | |
|---|---|
| Dye 3 described above | 2.5% |
| Diethylene glycol | 15% |
| TEGmBE | 10% |
| Olfine E1010 | 1.5% |
| Triethanolamine | 0.5% |
| Urea | 7% |
| Ion exchanged water | Balance |

Magenta ink m3

| | |
|---|---|
| C.I. Direct Red 227 | 2.5% |
| Glycerin | 15% |
| Ethanol | 4% |
| Ion exchanged water | Balance |

Cyan ink C1

| | |
|---|---|
| C.I. Direct Blue 86 | 4% |

-continued

| | |
|---|---|
| Diethylene glycol | 15% |
| DEGmBE | 10% |
| Olfine STG | 0.5% |
| Ion exchanged water | Balance |
| Cyan ink C2 | |
| C.I. Direct Blue 199 | 3.5% |
| Diethylene glycol | 15% |
| TEGmBE | 10% |
| Olfine E1010 | 1.5% |
| Triethanolamine | 1% |
| Ion exchanged water | Balance |
| Cyan ink c3 | |
| C.I. Direct Blue 86 | 4% |
| Glycerin | 15% |
| Ethanol | 4% |
| Ion exchanged water | Balance |

Print evaluation test

The ink compositions prepared above were combined as indicated in the following table to prepare ink sets of Examples 1 to 15 and Comparative Examples 1 to 6. These ink sets were used to perform the following evaluation tests.

TABLE 1

| | Black ink | Color ink | | |
|---|---|---|---|---|
| | | Yellow | Magenta | Cyan |
| Example | | | | |
| 1 | B1 | Y1 | M1 | C1 |
| 2 | B1 | Y2 | M2 | C2 |
| 3 | B1 | y3 | m3 | c3 |
| 4 | B2 | Y1 | M2 | C1 |
| 5 | B2 | Y2 | m3 | C2 |
| 6 | B2 | y3 | M1 | c3 |
| 7 | B3 | Y1 | M1 | C2 |
| 8 | B3 | Y2 | M2 | c3 |
| 9 | B3 | y3 | m3 | C1 |
| 10 | B4 | Y2 | M1 | C1 |
| 11 | B4 | y3 | M2 | C2 |
| 12 | B4 | Y1 | m3 | c3 |
| 13 | B5 | Y1 | M2 | C2 |
| 14 | B5 | Y2 | M1 | C1 |
| 15 | B5 | y3 | m3 | C1 |
| Comparative Example | | | | |
| 1 | b6 | Y1 | M1 | C1 |
| 2 | b6 | Y2 | M2 | C2 |
| 3 | b6 | y3 | m3 | c3 |
| 4 | b6 | Y1 | M1 | C1 |
| 5 | b7 | Y2 | M2 | C2 |
| 6 | b7 | y3 | m3 | c3 |

In the evaluation tests, an ink jet printer MJ-900C (manufactured by Seiko Epson Corporation) was used, and test paper used were as follows. The following paper (1) to (4) are the so-called "plain paper," and the paper (5) is a specialty paper (a coated paper) for an ink jet printer.

(1) EPP Paper (tradename, Epson Hanbai Corporation)

(2) Xerox P (tradename, Fuji Xerox Co., Ltd.)

(3) Xerox 4024 (tradename, Xerox USA)

(4) Ricopy 6200 (tradename, Ricoh Co., Ltd.)

(5) EPSON Fine Paper (tradename, Epson Hanbai Corporation)

Test 1: Quality of black letter

Alphabets and graphics were printed with the black ink on the above test paper. The resultant images were visually inspected for sharpness. Further, the optical density (OD value, reflection density) of 100% duty portion was measured with Macbeth TR-927 manufactured by Macbeth. The results were evaluated according to the following criteria:

A: No feathering with an OD value of not less than 1.30.

B: Somewhat feathering, which does not influence the image, with an OD value of not less than 1.25.

C: No significant feathering with an OD value of less than 1.25.

D: An OD value of less than 1.20.

Test 2: Evaluation of bleed

For the above test paper, blotted images of black, yellow, magenta, and cyan were printed adjacent to one another, and the images were visually inspected for color bleeding or uneven color mixing at boundary areas.

A: No bleeding.

B: Somewhat color bleeding or uneven mixing raising no practical problem.

C: Color bleeding or uneven mixing which raising some practical problem.

D: Severe color bleeding or uneven mixing.

The results are summarized in the following table. In the following table, (1) to (5) respectively means the above test paper (1) to (5).

TABLE 2

| | Test 1: Quality of black letter | | | | | Test 2: Bleeding between black and color | | | | |
|---|---|---|---|---|---|---|---|---|---|---|
| | (1) | (2) | (3) | (4) | (5) | (1) | (2) | (3) | (4) | (5) |
| Example | | | | | | | | | | |
| 1 | A | A | A | A | A | A | A | A | A | A |
| 2 | | | | | | A | A | A | A | A |
| 3 | | | | | | A | A | A | A | A |
| 4 | A | A | A | A | A | A | A | A | A | A |
| 5 | | | | | | A | A | A | A | A |
| 6 | | | | | | A | A | A | A | A |
| 7 | A | A | A | A | A | A | A | A | A | A |
| 8 | | | | | | A | A | A | A | A |
| 9 | | | | | | A | A | A | A | A |
| 10 | A | A | A | A | A | A | A | A | A | A |
| 11 | | | | | | A | A | A | A | A |
| 12 | | | | | | A | A | A | A | A |
| 13 | A | A | A | A | A | A | A | A | A | A |
| 14 | | | | | | A | A | A | A | A |
| 15 | | | | | | A | A | A | A | A |
| Comparative Example | | | | | | | | | | |
| 1 | B | B | B | B | A | C | C | C | B | A |
| 2 | | | | | | B | C | C | B | A |
| 3 | | | | | | D | D | D | D | B |
| 4 | C | C | C | C | A | C | D | D | B | A |
| 5 | | | | | | C | D | D | B | A |
| 6 | | | | | | D | D | D | D | C |

What is claimed is:

1. An ink composition for ink jet recording, comprising a carbon black and a cationic substance, said carbon black having on its surface a cationic group.

2. The ink composition according to claim 1, wherein the cationic group comprises a quaternary ammonium ($-NR_3^+$) or quaternary phosphonium group ($-PR_3^+$), wherein R represents hydrogen or an alkyl, alkoxy, phenyl or naphthyl group.

3. The ink composition according to claim 1, which further comprises 3 to 30 % by weight of a polyhydric alcohol.

4. The ink composition according to claim 1, which has a pH value in the range of from 7 to 10.

5. The ink composition according to claim 1, wherein the cationic substance is a compound having in its molecule a primary, secondary, tertiary, or quaternary amine, ammonium, or phosphonium.

6. An ink set for ink jet recording, comprising a plurality of ink compositions including the ink composition according to claim 1.

7. The ink set according to claim 6, comprising at least one color ink selected from the group consisting of a yellow ink, a magenta ink, and a cyan ink.

8. The ink set according to claim 7, wherein the color ink comprises an anionic material.

9. The ink set according to claim 8, wherein the anionic material is an anionic dye.

10. The ink set according to claim 9, wherein the color ink comprises a nonionic acetylene glycol surfactant.

11. The ink set according to claim 10, wherein the nonionic acetylene glycol surfactant is contained in an amount of 0.1 to 3.0 % by weight.

12. The ink set according to claim 6, wherein the color ink comprises a glycol ether.

13. The ink set according to claim 12, wherein the glycol ether is at least one member selected from the group consisting of diethylene glycol monobutyl ether, triethylene glycol monobutyl ether, propylene glycol monobutyl ether, and dipropylene glycol monobutyl ether.

14. The ink set according to claim 12, wherein the glycol ether is contained in an amount of 3 to 30% by weight.

15. An ink jet recording method comprising the step of: ejecting and depositing droplets of the ink composition of claim 1 onto a recording medium to conduct printing.

16. A record produced by the ink jet recording method according to claim 15.

17. An ink jet recording method comprising the step of: ejecting and depositing droplets of the ink composition of claim 2 onto a recording medium to conduct printing.

18. An ink jet recording method comprising the step of: ejecting and depositing droplets of the ink composition of claim 3 onto a recording medium to conduct printing.

19. An ink jet recording method comprising the step of: ejecting and depositing droplets of the ink composition of claim 4 onto a recording medium to conduct printing.

20. An ink jet recording method comprising the step of: ejecting and depositing droplets of each of the plurality of ink compositions of the ink set of claim 7 onto a recording medium to conduct printing.

21. An ink jet recording method comprising the step of: ejecting and depositing droplets of the ink composition of claim 5 onto a recording medium to conduct printing.

22. In an ink jet recording method comprising ejecting and depositing a droplet of a black ink composition onto a recording medium adjacent to a droplet of a color ink composition, the improvement wherein the black ink composition is the ink composition of claim 1, said carbon black being present in the ink composition in an amount of about 1 to 15% by weight, said cationic substance being present in the ink composition in an amount of about 0.5 to 10% by weight.

* * * * *